United States Patent [19]

Albrecht et al.

[11] 3,907,791
[45] Sept. 23, 1975

[54] BIS-BASIC KETONES OF FLUORANTHENE

[75] Inventors: William L. Albrecht; Robert W. Fleming, both of Cincinnati, Ohio

[73] Assignee: Richardson-Merrell Inc., Wilton, Conn.

[22] Filed: Nov. 22, 1972

[21] Appl. No.: 308,806

Related U.S. Application Data

[63] Continuation of Ser. No. 32,348, April 27, 1970, abandoned.

[52] U.S. Cl.... 260/246 B; 260/239 BE; 260/239 R; 260/239 BA; 260/246 B; 260/268 PC; 260/293.54; 260/293.62; 260/326.5 J; 260/465 B; 260/570.5 P; 260/592; 424/248; 424/267; 424/325

[51] Int. Cl.² ......................................... C07D 87/34

[58] Field of Search... 260/570.5 C, 570.5 P, 246 B, 260/293.62, 268 PC, 326.5 J

[56] References Cited
OTHER PUBLICATIONS

Chem. Abstracts: Vol. 56: 7472f (1959).
Chem. Abstracts: Vol. 51: 16394d (1957).

*Primary Examiner*—Lorraine A. Weinberger
*Assistant Examiner*—Paul J. Killos
*Attorney, Agent, or Firm*—George W. Rauchfuss, Jr.

[57] ABSTRACT

The novel bis-basic ketones of fluoranthene of the present invention have antiviral activity when administered orally and parenterally. These compounds are represented by the following general formula:

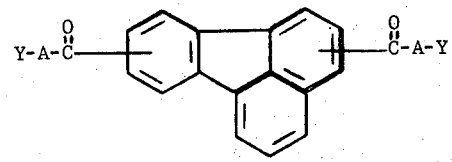

wherein each A is a straight or branched alkylene chain having from 1 to about 6 carbon atoms; and each Y is A. the group

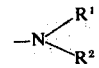

wherein $R^1$ and $R^2$ are individually hydrogen, (lower-)alkyl having from 1 to 6 carbon atoms, cycloalkyl having from 3 to 6 carbon atoms, alkenyl of from 3 to 6 carbon atoms and having the vinyl unsaturation in other than the 1-position of the alkenyl group; or B. the group

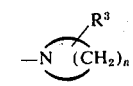

wherein $n$ is a whole integer of from 4 to 6 and $R^3$ is hydrogen, (lower)-alkyl of from 1 to about 4 carbon atoms, phenyl, or benzyl and can be linked to any one of the carbon atoms of the heterocyclic group; or C. the group

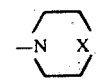

wherein X is oxygen or $NR^4$, and $R^4$ is hydrogen or (lower)alkyl of from 1 to about 4 carbon atoms; or D. the group

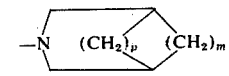

wherein $p$ is a whole integer from 2 to 3 and $m$ is a whole integer from 1 to 2 or;

E. the group

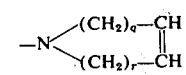

wherein $q$ is a whole integer from 1 to 2, and $r$ is a whole integer from 1 to 3 providing when $r$ is equal to 3, $q$ is 1; or a pharmaceutically acceptable acid addition salt of said base.

These new compounds can be prepared by several different methods which are described.

18 Claims, No Drawings

BIS-BASIC KETONES OF FLUORANTHENE

This is a continuation of application Ser. No. 32,348, filed Apr. 27, 1970 now abandoned.

This invention relates to novel bis-basic ketones of fluoranthene their method of preparation and use as antiviral agents. The compounds of this invention include both the base form and pharmaceutically acceptable acid addition salts of the base wherein the base form is represented by the general formula

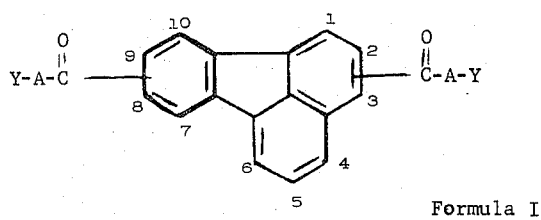

Formula I wherein each A is a straight or branched alkylene chain having from 1 to about 6 carbon atoms; and each Y is A. the group

wherein $R^1$ and $R^2$ are individually hydrogen, (lower)alkyl having from 1 to 6 carbon atoms, cycloalkyl having from 3 to 6 carbon atoms, alkenyl of from 3 to 6 carbon atoms and having the vinyl unsaturation in other than the 1-position of the alkenyl group; or B. the group

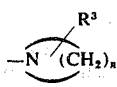

wherein $n$ is a whole integer of from 4 to 6 and $R^3$ is hydrogen, (lower)alkyl of from 1 to about 4 carbon atoms, phenyl or benzyl and can be linked to any one of the carbon atoms of the heterocyclic group; or C. the group

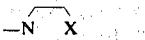

wherein X is oxygen or $NR^4$, and $R^4$ is hydrogen or (lower)alkyl of from 1 to about 4 carbon atoms; or D. the group

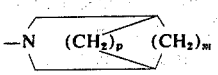

wherein $p$ is a whole integer from 2 to 3 and $m$ is a whole integer from 1 to 2; or E. the group

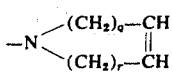

wherein $q$ is a whole integer from 1 to 2 and $r$ is a whole integer from 1 to 3 providing when $r$ is equal to 3, $q$ is 1.

As can be seen from the above Formula I one of the basic ketone groups that is,

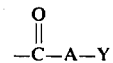

is on the naphthalene portion of the fluoranthene ring whereas the other is on the benzene portion of the fluoranthene ring. Thus, one of the basic groups can be linked to the fluoranthene ring by replacement of one of the hydrogen atoms in positions 1 through 6, and the other replaces one of the hydrogen atoms in positions 7 through 10 of the fluoranthene ring. Preferably one of the basic ketone groups is in the 3-position and the other in the 8- or 9-position of the fluoranthene ring.

It is apparent from the above Formula I and its description that compounds can have structures wherein Y is the group

as more fully shown by the following general Formula II, or wherein Y is the group

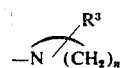

as more fully shown by the following general Formula III, or wherein Y is the group

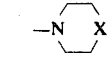

as more fully shown by the following general Formula IV, or wherein Y is the group

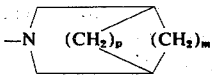

as more fully shown by the following general Formula V, or wherein Y is the group

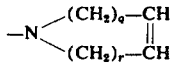

as more fully shown by the following general Formula VI below:

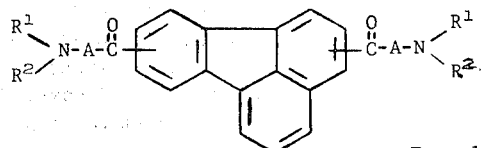

Formula II

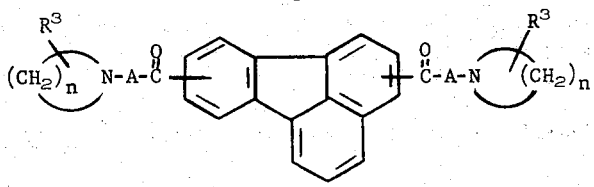

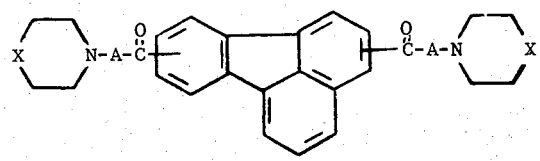

Formula III

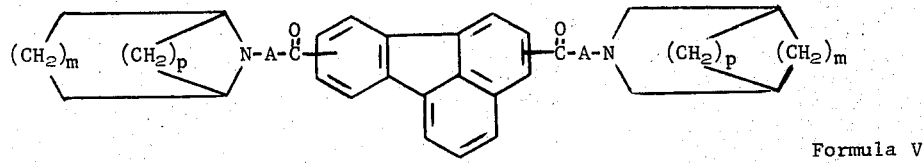

Formula IV

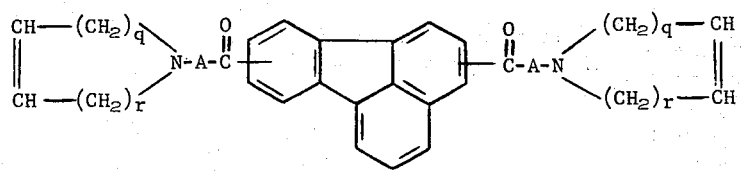

Formula V

CH—(CH₂)q... etc.

Formula VI

In the general Formula II, III, IV, V and VI the various symbols, that is, A, $R^1$, $R^2$, $R^3$, X, n, m, p, q and r have the meanings given hereinbefore.

Each of the symbols A in the compounds of the above Formulas II, III, IV, V and VI is an alkylene group having from 1 to about 6 carbon atoms which can be a straight chain, that is, for example, —CH$_2$—(CH$_2$)$_s$— wherein s is a whole integer of from 0 to 5, or a branched chain. Each of the alkylene groups as represented by A can be the same or different. Preferably these groups are the same. Illustrative of alkylene groups as represented by A there can be mentioned for example: methylene, 1,2-ethylene, 1,3-propylene, 1,4-butylene, 1,5-pentylene, 1,6-hexylene, 2-methyl-1,4-butylene, 2-ethyl-1,4-butylene, 3-methyl-1,5-pentylene and the like.

Each amino group of the compounds of Formula II, that is,

can be a primary, a secondary or a tertiary amino group. Each $R^1$ and $R^2$ is individually hydrogen, (lower)alkyl having from 1 to about 6 carbon atoms, cycloalkyl having from 3 to 6 carbon atoms, alkenyl of from 3 to 6 carbon atoms and having the vinyl unsaturation in other than the 1-position of the alkenyl group. Preferably each of the amino groups as represented by

is a tertiary amino group.

The term (lower)alkyl as used in reference to the compounds of Formula II relates to straight or branched alkyl chains having from 1 to 6 carbon atoms. Illustrative of (lower)alkyls as can be represented by each $R^1$ or $R^2$ in the compounds of Formula II there can be mentioned for example: methyl, ethyl, n-propyl, isopropyl, n-butyl, isobutyl, secondary-butyl, n-amyl, isoamyl, n-hexyl and the like.

Illustrative of cycloalkyl groups as represented by each of $R^1$ or $R^2$ in the compounds of Formula II there can be mentioned for example: cyclopropyl, cyclobutyl, cyclopentyl and cyclohexyl.

When $R^1$ or $R^2$ in the compounds of Formula II represents an alkenyl group, the vinyl unsaturation is in a position other than the 1-position of said alkenyl group. Illustrative of alkenyl groups as represented by $R^1$ and $R^2$ there can be mentioned for example: allyl, 3-butenyl, 4-hexenyl and the like.

Each heterocyclic group of Formula III, that is,

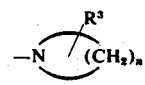

can be a monocyclic heterocyclic group such as those generally equivalent to di(lower) alkylamino groups in the pharmaceutical arts or substituted monocyclic heterocyclic groups. The heterocyclic groups in the compounds of Formula III can be 5-, 6- or 7-membered rings, that is, $n$ is from 4 to 6. The $R^3$ groups can be hydrogen, a straight or branched (lower) alkyl chain of from 1 to about 4 carbon atoms, phenyl, or benzyl and can be attached to any one of the heterocyclic carbon atoms. Illustrative of heterocyclic groups as represented by each

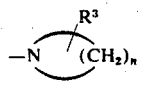

there can be mentioned for example: piperidino, pyrrolidino, 4-methylpiperidino, 3-methylpiperidino, 4-tert-butylpiperidino, 4-benzylpiperidino, 4-phenylpiperidino and the like.

Each heterocyclic group of Formula IV, that is,

in addition to the one nitrogen atom, can contain a second hetero atom that is, X is oxygen or N—$R^4$. The $R^4$ group can be hydrogen or a straight or branched (lower)alkyl chain of from 1 to about 4 carbon atoms. As examples of heterocyclic groups as represented by

there can be mentioned for example: morpholino, piperazine, N-(lower)alkylpiperazino, such as, for example N-methyl- or N-ethylpiperazino and the like.

Each bicyclic heterocyclic group in the compounds of Formula V, that is,

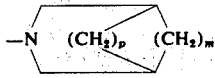

can be an 8-, 9- or 10-membered ring, that is, $p$ is from 2 to 3, and $m$ is from 1 to 2. As examples of such bicyclic heterocyclic groups there can be mentioned for example; 3-azabicyclo[3.2.2]nonan-3-yl, and the like.

Each unsaturated monocyclic heterocyclic group of Formula VI, that is,

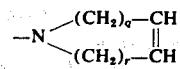

can be a 5-, 6- or 7-membered ring, that is, $q$ is from 1 to 2, and $r$ is from 1 to 3 providing that when $r$ is 3, $q$ is 1. The unsaturation is thus in a position other than $\alpha\beta$ to the nitrogen atom. Illustrative of substituted monocyclic heterocyclic groups there can be mentioned: 3-pyrrolino, 1,2,3,6-tetrahydropyridyl and the like.

Illustrative of the base compounds of this invention as represented by Formula I there can be mentioned for example: 3,9-bis(4-aminobutyryl)fluoranthene, 3,9-bis(4-ethylaminobutyryl)fluoranthene, 3,9-bis(4-diethylaminobutyryl)fluoranthene, 3,8-bis(4-diethylaminobutyryl)fluoranthene, 3,9-bis(6-piperidinocaproyl)fluoranthene, 3,9-bis(4-morpholinobutyryl)fluoranthene, 3,9-bis(5-piperidino-4-methylvaleryl)fluoranthene, 3,9-bis(5-piperidino-3-methylvaleryl)fluoranthene, 3,9-bis[4-(4-methylpiperidino)butyryl]fluoranthene, 3,9-bis(piperidinoacetyl)fluoranthene, 3,9-bis(3-piperidinopropionyl)fluoranthene, 3,9-bis[5-(1,2,3,6-tetrahydro-1-pyridyl)valeryl]fluoranthene, 3,9-bis[5-(3-azabicyclo[3.2.2]nonan-3-yl)valeryl]fluoranthene, 3,8-bis(4-piperidinobutyryl)fluoroanthene, 3,9-bis[4-(4-phenylpiperidino)butyryl]fluoranthene, 3,9-bis[4-(4-benzylpiperidino)butyryl]fluoranthene, 3,9-bis[4-(N-methylpiperazino)butyryl]fluoranthene and the like.

Pharmaceutically acceptable acid addition salts of the base compounds of this invention are those of any suitable inorganic or organic acids. Suitable inorganic acids are for example, hydrochloric, hydrobrominc, sulfuric or phosphoric acids and the like. Suitable organic acids are for example carboxylic acids such as acetic, propionic, glycolic, lactic, pyruvic, malonic, succinic, fumaric, malic, tartaric, citric, ascorbic, maleic, hydroxymaleic, benzoic, hydroxybenzoic, phenylacetic, cinnamic, salicyclic, 2-phenoxybenzoic and the like, or sulfonic acids such as methane sulfonic, 2-hydroxyethane sulfonic acid and the like. Mono- or di-acid salts may be formed, and the salts can be hydrated or substantially anhydrous.

The compounds of the present invention can be administered to animals such as warm-blooded animals and particularly mammals to prevent or inhibit infections of: picornaviruses, for example encephalomyocarditis; myxo-viruses, for example, Influenza $A_2$ (Jap/305); arboviruses, for example, Semliki Forest; herpes virus group, for example, herpes simplex; and poxviruses, for example, Vaccinia IHD. When administered prior to infection, that is, prophylactically, it is preferred that the administration be within 0 to 96 hours prior to infection of the animal with pathogenic virus. When administered therapeutically to inhibit an infection, it is preferred that the administration be within about a day or two after infection with pathogenic virus.

The dosage administered will be dependent upon the virus for which treatment or prophylaxis is desired, the type of animal involved, its age, health, weight, extent of infection, kind of concurrent treatment, if any, frequency of treatment and the nature of the effect desired. Illustratively, dosage levels of the administered active ingredients can be: intravenous, 0.1 to about 10 mg/kg; intraperitoneal, 0.1 to about 50 mg/kg; subcutaneous, 0.1 to about 250 mg/kg; oral, 0.1 to about 500 mg/kg and preferably about 1 to 250 mg/kg; intranasal instillation, 0.1 to about 10 mg/kg; and aerosol, 0.1 to about 10 mg/kg of animal body weight.

The compounds may be administered, dissolved or suspended, in any conventional non-toxic pharmaceutical carrier of the type that may be taken orally, applied topically, bucally or parenterally. -$\beta$ One of the methods used to prepare the compounds of this invention is illustrated by the following reaction scheme 1:

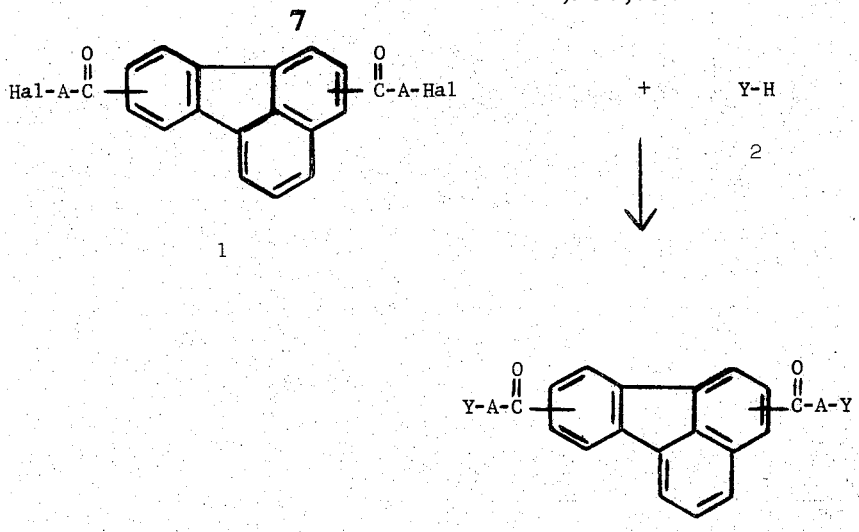

Formula I

In this reaction A and Y have the meaning defined hereinbefore, and each Hal is either chlorine, bromine or iodine.

Bis-haloalkanoylfluoranthene derivatives 1 in which the position of substitution is 3,9-, can be prepared by a Friedel-Crafts acylation of fluoranthene. Of suitable acylating agents which may be used there can be mentioned for example: chloroacetyl chloride, bromoacetyl bromide, 3-chloropropionyl chloride, 4-chlorobutyryl chloride, 5-chlorovaleryl chloride, 5-chloro-4-methylvaleryl chloride, 5-chloro-3-methylvaleryl chloride and the like.

It is obvious to those skilled in the art that the acylation reaction may be carried out in a variety of solvents and under catalysis of a variety of Lewis acids. The temperature and duration of the reaction may be varied to allow for optimum reaction conditions. A preferred procedure is to combine one equivalent of fluoranthene with 2.5 equivalents of an acylating agent in methylene chloride followed by portionwise addition of aluminum chloride. The temperature of the reaction is maintained below zero degrees with continuous stirring. After the additions are complete the temperature may be elevated to 25°–40°C for 12 to 36 hours. The reaction mixture is worked up in the usual manner by decomposing the complex with ice water/HCl. The product obtained is recrystallized from methylene chloride, chloroform, or the like. The procedure may be varied such that there is a reverse addition of acylating agent and Lewis acid, or a reverse addition of aromatic hydrocarbon and Lewis acid. The more reactive halogen derivative, that is, the bis($\omega$-iodoalkanoyl)fluoranthene may be prepared from the corresponding bis-chloro derivative using a halogen exchange reaction under the conditions generally employed in the Conant-Finkelstein reaction.

Of typical amines, 2, useful in reaction 1 there can be mentioned for example: ammonia, or a compound which is a potential source of ammonia such as, for example, hexamethylenetetramine and the like; primary amines such as ethylamine, propylamine and the like; and secondary amines such as diethylamine, dibutylamine, piperidine, 4-methylpiperidine, morpholine, piperazine, N-ethylpiperazine, 6-azabicyclo[3.2.1]octane, 1,2,3,6-tetrahydropyridine and the like.

The amination of bis-($\omega$-haloalkanoyl)fluoranthene, 1, may be carried out under a variety of conditions. For example, compound 1 may be heated together with a large excess of the amine, 2, the excess amine serving as the reaction medium and the hydrohalide acceptor. This method is particularly suitable for readily available amines, the excess of which can be easily removed from the reaction mixture by, for example, distillation at reduced pressure or by washing the product with water. Or, one equivalent of compound 1 and four equivalents of the amine, 2, may be heated together in one of a number of different types of solvents, for example, in aromatic solvents such as benzene, toluene, xylene, and the like; or others such as tetrahydrofuran, dioxane and the like; or ketones such as acetone, butanone and the like; or aprotic solvents such as N,N-dimethylformamide, N,N-dimethylacetamide, dimethyl sulfoxide and the like; or mixtures of these solvents with water. The reaction between compound 1 wherein the halogen is Cl and the amine, 2, is frequently promoted by the addition of either sodium or potassium iodide, the iodide being used in either catalytic or stoichiometric amounts. In some cases, it may be advantageous to use only two equivalents of the amine, 2, for each equivalent of the bis-($\omega$-haloalkanoyl)fluoranthene, 1, an excess of an inorganic base such as powdered sodium or potassium carbonate being used as the hydrohalide acceptor. The reaction will proceed normally in 12 to 72 hours at temperatures of 20° to 150°C. As volatile amines are employed, the reaction is best carried out under pressure in a suitable pressure reactor or autoclave.

Alternately, the amination reaction may be carried out on a derivative of compound 1 such as the bis-ketal fluoranthene derivative, which may be prepared by allowing bis($\omega$-haloalkanoyl)fluoranethene and an excess of ethyl orthoformate to react in the presence of an acid catalyst such as hydrochloric acid for several days in a polar solvent such as ethanol, tetrahydrofuran and the like.

The compounds of formula I wherein A is an alkylene chain of 3 to 6 carbon atoms may also be prepared by the reaction of a Grignard reagent with a dinitrile of fluoranthene as represented by the following reaction scheme 2:

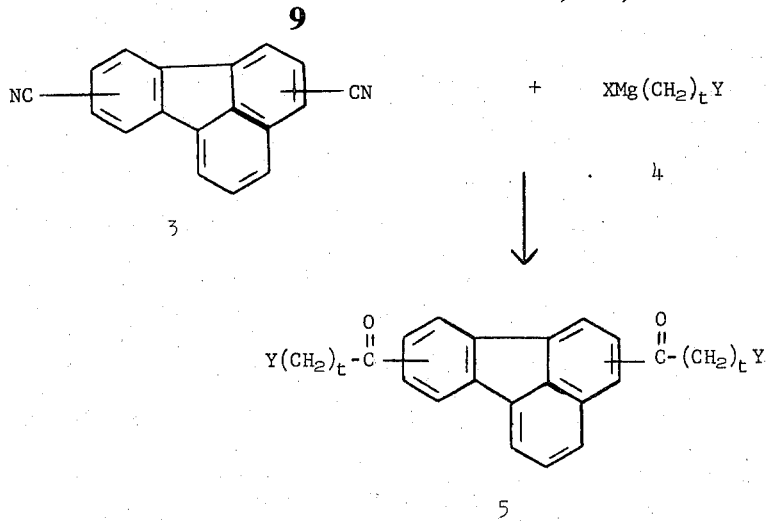

In the above reaction X is bromine or chlorine, $t$ is 3 to 6 and Y may be any of the groups defined hereinbefore except those which contain a hydrogen attached to the nitrogen atom.

The reaction will proceed in from 1 to 24 hours at a temperature ranging from room temperature to about 80°C. The Grignard reagent, 4, may be prepared by reacting magnesium and an aminoalkyl halide of the formula $$X(CH_2)_t Y$$

wherein X, $t$, and Y have the meaning defined hereinabove. The preferred solvent for this reaction is tetrahydrofuran.

The dicyanofluoranthene derivative, 3, may be prepared from known diamines by a Sandmeyer reaction on the tetrazonium salts or from known fluoranthene dicarboxylic acids by dehydration of the corresponding amides by standard procedures.

The compounds of Formula I wherein A is —CH$_2$CH$_2$— may also be prepared by the Mannich reaction represented by the following reaction scheme 3:

ceed in from 1 to 24 hours in solvents such as water, acetic acid, ethanol, butanol, dioxane, tetrahydrofuran and the like and at temperatures equivalent to the reflux temperature of the solvent. In this reaction two sources of formaldehyde may be employed. When formalin is used the reaction may be conducted with a suspension of compound 6 or a co-solvent such as methanol may be added to allow the reaction to proceed in a homogeneous medium. When the source of formaldehyde is paraformaldehyde the reaction is carried out in an organic solvent such as those mentioned above. It is sometimes desirable to add a slight excess of hydrochloric acid to promote depolymerization of paraformaldehyde either during the reaction or at the end of the reaction.

The secondary amine, compound 2, employed in this reaction may be added to the reaction medium as the hydrochloride salt or as the base form with subsequent in situ formation of the hydrochloride salt by the addition of hydrochloric acid. Of typical secondary amines which may be utilized in the above reaction there can be mentioned for example: dimethylamine, dibutyl-

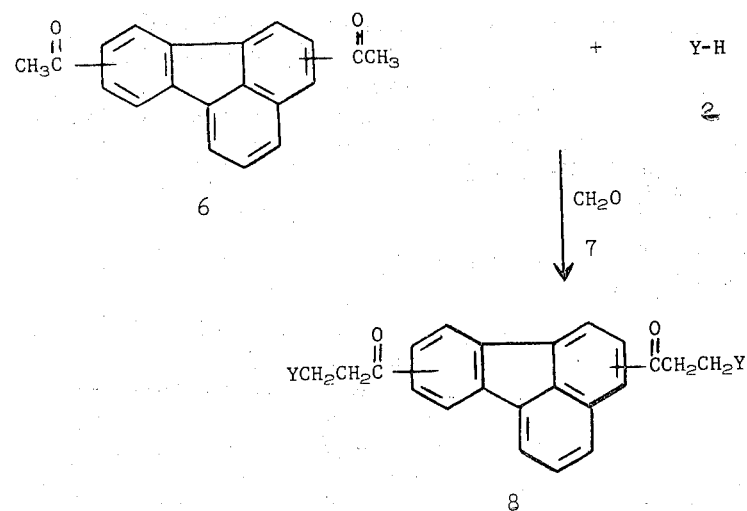

By combining one equivalent of compound 6 and two or more equivalents of compound 2 with three or more equivalents of formaldehyde, 7, the reaction will proamine, piperidine, 4-methylpiperidine, morpholine, N-ethylpiperazine, 6-azabicyclo[3.2.1]octane and the like.

The diacetylfluoranthene compound, 6, may be prepared by a Friedel-Crafts acylation reaction on fluoranthene or by a Grignard reaction of dicyanofluoranthene, 3, with methylmagnesium halide. The dicyanofluoranthene compound may be obtained by the methods described hereinbefore.

Representative compounds of the present invention and several of the methods of preparing them, mentioned above, are illustrated in the following specific examples.

EXAMPLE 1

3,9-Bis(4-Chlorobutyryl)Fluoranthene

A mixture of 28.7g (0.142 mole) of fluoranthene and 50.0g (0.354 mole) of 4-chlorobutyryl chloride in 1500 ml of methylene chloride was chilled to −20°C, and 39.8g (0.298 mole) of aluminum chloride was added with rapid stirring. Stirring was continued for 16 hours at room temperature. The reaction mixture was poured onto a mixture of ice/conc. HCl, and the organic layer which separated was washed with a saturated sodium bicarbonate solution, dried over magnesium sulfate and filtered. The filtrate was evaporated to dryness leaving a solid residue which was recrystallized once from ethyl acetate to yield the desired product. M.P. 124°–127°C; $\lambda_{max}^{CHCl_3}$ 306, $E_{1cm}^{1\%}$ 902.

EXAMPLE 2

3,9-Bis(3-Chloropropionyl)Fluoranthene

Following the procedure of Example 1 only substituting for 4-chlorobutylryl chloride, 44.9g (0.354 mole) of 3-chloropropionyl chloride, the solid residue obtained on workup was recrystallized from chloroform to yield the desired product. M.P. 154°–156°C.

EXAMPLE 3

3,9-Bis(2-Chloroacetyl)Fluoranthene

Following the procedure of Example 1 only substituting for 4-chlorobutyryl chloride, 40.0g (0.354 mole) of chloroacetyl chloride, the solid residue obtained on workup was recrystallized from N,N-dimethylformamide to give the desired product. M.P. 231°–233°C, $\lambda_{max}^{DMF}$ 305, $E_{1cm}^{1\%}$ 966.

EXAMPLE 4

3,9-Bis(5-Chlorovaleryl)Fluoranthene

Following the procedure of Example 1 only substituting for 4-chlorobutyryl chloride, 54.8g (0.354 mole) of 5-chlorovaleryl chloride, the solid residue obtained on workup was recrystallized from ethyl acetate to give the desired product. M.P. 142°–144°C, $\lambda_{max}^{p-dioxane}$ 307, $E_{1cm}^{1\%}$ 834.

EXAMPLE 5

3,9-Bis(4-Chlorobutyryl)Fluoranthene Bis-Diethyl Ketal

A mixture of 51.7g (0.12 mole) of 3,9-bis(4-chlorobutyryl)fluoranthene, 95g (0.64 mole) of ethyl orthoformate and 10 ml of ethanolic HCl in 800 ml of tetrahydrofuran was stirred at room temperature for 5 days. Following neutralization of the excess acid, the solution was poured into 2.0 l of cold water, and the organic layer was extracted into ether, washed with water, dried and the solvent evaporated to give the amber viscous oily product.

EXAMPLE 6

By the method of Example 1, but substituting for 4-chlorobutyryl chloride, the appropriate molar equivalent amounts of 4-chlorovaleryl chloride, 4-chloro-2-methylbutyryl chloride or 5-chloro-3-methylvaleryl chloride, each of which can be prepared by treating respectively γ-valerolactone, α-methyl-γ-butyrolactone and β-methyl-δ-valerolactone with thionyl chloride and anhydrous zinc chloride ]O. Wheeler and E. de Rodriquez, J. Org. Chem. 29, 1227(1964)] the following compounds are prepared:

3,9-Bis(4-chlorovaleryl)fluoranthene
3,9-Bis(4-chloro-2-methylbutyryl)fluoranthene
3,9-Bis(5-chloro-2-methylvaleryl)fluoranthene.

EXAMPLE 7

3,9-Bis(Dimethylaminoacetyl)Fluoranthene Dihydrochloride Dihydrate

A mixture of 15.0g (0.042 mole) of 3,9-bis(chloroacetyl)fluoranthene, 100 ml of 40% dimethylamine and 7.0g of potassium iodide in 200 ml of butanone was placed in a Paar bomb and heated at 70°–80°C with stirring for 2 hours. The reaction mixture was cooled and poured into 2.0 l of ice water, and the solid which precipitated was filtered off, dissolved in chloroform and dried over magnesium sulfate to give the free base of the desired product. The free base was converted to the dihydrochloride salt and recrystallized from methanol-acetone. M.P. 285°–288°C, $\lambda_{max}^{EtOH}$ 307, $E_{1cm}^{1\%}$ 770.

EXAMPLE 8

3,9-Bis(Diethylaminoacetyl)Fluoranthene Dihydrochloride

Following the procedure of Example 7 only substituting for dimethylamine, 50 ml of diethylamine, the desired product was obtained. M.P. 248°–250°C.

EXAMPLE 9

3,9-Bis(Piperidinoacetyl)Fluoranthene Dihydrochloride Tetrahydrate

Following the procedure of Example 7 only substituting for dimethylamine, 28.1g (0.33 mole) of piperidine the desired product was obtained ed. M.P. 263°–265°C (dec.), $\lambda_{max}^{EtOH}$ 307, $E_{1cm}^{1\%}$ 641.

EXAMPLE 10

3,9-Bis(4-Methylpiperidinoacetyl)Fluoranthene Dihydrochloride

A solution of 3.9g (0.011 mole) of 3,9-bis(chloroacetyl)fluoranthene, 8.7g (0.088 mole) of 4-methylpiperidine, 3.5g of potassium iodide and 100 ml of butanone was refluxed with stirring for 16 hours then poured into water and 500 ml of methylene chloride was added. The organic layer which separated was washed with a water-saturated sodium chloride solution, dried over magnesium sulfate and filtered. The filtrate was acidified with ethereal HCl and the solid which precipitated was recrystallized twice with methanol-butanone to give the desired product. M.P. 228°–231°C, $\lambda_{max}^{H_2O}$ 307, $E_{1cm}^{1\%}$ 648.

EXAMPLE 11

3,9-Bis(3-Piperidinopropionyl)Fluoranthene Dihydrochloride

A solution of 8.0g (0.02 mole) of 3,9-bis(3-chloropropionyl)fluoranethene, 50 ml piperidine, 50 ml chloroform and 200 ml p-dioxane was refluxed for 15 minutes with stirring and filtered. After washing the filtrate with water, the chloroform solution which separated was removed, combined with ether, washed with water then aqueous hydrochloric acid. The resulting precipitate was filtered and recrystallized once from water-acetone to yield the desired product. M.P. 206°–210°C, $\lambda_{max}^{EtOH}$ 305, $E_{1cm}^{1\%}$ 630.

EXAMPLE 12

3,9-Bis(4-Aminobutyryl)Fluoranthene Dihydrochloride

An ethanolic solution of 1 equivalent of 3,9-bis(4-chlorobutyryl)fluoranthene bis-diethyl ketal and 2.4 equivalents of hexamethylenetetramine were reacted at reflux for 36 hours. The reaction mixture was acidified with 3N HCl, digested for several hours and the solvent removed under reduced pressure to give the desired product which was purified by recrystallization from methanol-ethyl acetate.

EXAMPLE 13

3,9-Bis(4-Ethylaminobutyryl)Fluoranthene Dihydrochloride

By the procedure of Example 12 only substituting for hexamethylenetetramine, a 100-fold excess of ethylamine the desired product is obtained.

EXAMPLE 14

3,9-Bis[4-(Dimethylamino)Butyryl]Fluoranthene Dihydrochloride

To a solution of 20.5g (0.05 mole) of 3,9-bis(4-chlorobutyryl)fluoranthene and 200 ml of p-dioxane in a Paar bomb, 16.6g of potassium iodide and 50 ml of 40% dimethylamine were added. The reaction mixture was heated at approximately 125°C for 24 hours, filtered and the filtrate evaporated leaving an oily residue which was dissolved in ether and acidified with ethereal HCl. The resulting precipitate was recrystallized 3 times from methanol-butanone to yield the desired product. M.P. 245°–250°C, $\lambda_{max}^{EtOH}$ 304, $E_{1cm}^{1\%}$ 751.

EXAMPLE 15

3,9-Bis[4-(Diethylamino)Butyryl]Fluoroanthene Dihydrochloride

A solution of 15.0g (0.037 mole) of 3,9-bis(4-chlorobutyryl)fluoranthene, 100 ml of diethylamine, 2.0g of potassium iodide and 100 ml of tetrahydrofuran (THF) was heated at reflux with stirring for 3 days and filtered. The filtrate was poured onto ice water and the oil which separated was decanted and dissolved in ether. The ether solution was washed with a water-saturated sodium chloride solution, dried over magnesium sulfate and filtered. The filtrate was acidified with ethereal HCl, and the resulting precipitate was recrystallized twice from methanol-butanone to yield the desired product. M.P. 236°–239°C, $\lambda_{max}^{EtOH}$ 305, $E_{1cm}^{1\%}$ 709.

EXAMPLE 16

3,9-Bis(4-Pyrrolidinobutyryl)Fluoranthene Dihydrochloride

A solution of 20.5g (0.05 mole) of 3,9-bis(4-chlorobutyryl)fluoranthene, 15.2g (0.22 mole) of pyrrolidine, 1g of potassium iodide and 250 ml of p-dioxane was heated at reflux for 20 hours, poured into 500 ml of ice water and extracted with ether. The ether extract was evaporated to dryness and 100 ml of toluene was added then evaporated. The residue was dissolved in ether and the solution acidified with ethereal HCl. The resulting precipitate was recrystallized twice from methanol-ethanol and once from acetonitrile to give the desired product. M.P. 230°–234°C, $\lambda_{max}^{MeOH}$ 303, $E_{1cm}^{1\%}$ 692.

EXAMPLE 17

3,9-Bis(4-Piperidinobutyryl)Fluoranthene Dihydrochloride

A solution of 10.7g (0.026 mole) of 3,9-bis(4-chlorobutyryl)fluoranthene, 8.9g (0.104 mole) of piperidine and 40 ml of dimethylformamide was heated on a steam bath for 24 hours then poured into water. The aqueous solution was extracted with ether and the ether extract was washed with a water-saturated sodium chloride solution, dried over magnesium sulfate and filtered. The filtrate was acidified with ethereal HCl, and the resulting precipitate recrystallized once from isopropyl alcohol to yield the desired product. M.P. 265°C, $\lambda_{max}^{EtOH}$ 305, $E_{1cm}^{1\%}$ 651.

EXAMPLE 18

3,9-Bis(4-Piperidinobutyryl)Fluoranthene

A solution of 11.3g (0.03 mole) of 3,9-bis(4-chlorobutyryl)fluoranthene, 20.4g (0.24 mole) of piperidine, 10.0g (0.06 mole) potassium iodide and 200 ml butanone was stirred and heated at reflux for 3 days then poured into 1000 ml of water. The resulting precipitate was filtered and recrystallized 3 times from chloroform-acetone to yield the desired product. M.P. 126°–128.5°C, $\lambda_{max}^{CHCl_3}$ 306, $E_{1cm}^{1\%}$ 797.

EXAMPLE 19

3,9-Bis(4-Piperidinobutyryl)Fluoranthene Bis-Dihydrogen Citrate

By the procedure of Example 18, 3,9-bis(4-piperidinobutyryl)fluoranthene was prepared and treated with 2 equivalents of citric acid in hot butanone to give the desired product which was recrystallized from methanol-butanone.

EXAMPLE 20

3,8-Bis(4-Piperidinobutyryl)Fluoranthene Dihydrochloride

A solution of 2.5 equivalents of 3-Piperidinopropyl-magnesium chloride in tetrahydrofuran and 1 equivalent of 3,8-dicyanofluoranthene [N. Campbell et al., J. Chem. Soc., 2784 (1950)] dissolved in tetrahydrofuran were combined and refluxed for 2 hours followed by stirring for several hours at room temperature. The reaction mixture was treated with saturated ammonium chloride, and the organic layer was extracted into chloroform and treated with dilute HCl. The chloroform was distilled off, and the aqueous solution was filtered, cooled, made alkaline and extracted with several portions of ether. The ether layers were combined, dried over magnesium sulfate and treated with ethereal HCl to give the desired product which was purified by recrystallization from methanol-ethyl acetate.

EXAMPLE 21
3,9-Bis[4-(4-Methylpiperidino)Butyryl]Fluoranthene Dihydrochloride A solution of 20.6g (0.05 mole) of 3,9-bis(4-chlorobutyryl)fluoranthene, 39.6g (0.4 mole) of 4-methylpiperidine, 16.6g of potassium iodide and 200 ml of butanone was refluxed with stirring for 24 hours then poured into water. The organic layer which separated was washed with a water-saturated sodium chloride solution, dried over magnesium sulfate, filtered and the filtrate acidified with ethereal HCl. The solid which precipitated was recrystallized three times from methanol-butanone to yield the desired product. M.P. 254°–256°C, $\lambda_{max}^{H_2O}$ 303, $E_{1cm}^{1\%}$ 589.

EXAMPLE 22
3,9-Bis[4-(4-Propylpiperidino)Butyryl]Fluoranthene

Following the procedure of Example 18 only substituting for piperidine, 30.5g (0.24 mole) of 4-propylpiperidine, the solid obtained on workup was recrystallized once from chloroform-acetone to give the desired product. M.P. 129°–135.5°C, $\lambda_{max}^{CHCl_3}$ 305, $E_{1cm}^{1\%}$ 676.

EXAMPLE 23
3,9-Bis[4-(4-Tert-Butylpiperidino)Butyryl]Fluoranthene

Following the procedure of Example 18 only substituting for piperidine, 33.9g (0.24 mole) of 4-tert-butylpiperidine, the solid obtained on workup was recrystallized once from chloroform-acetone and once from methanol-butanone to yield the desired product. M.P. 150°–152°C, $\lambda_{max}^{CHCl_3}$ 306, $E_{1cm}^{1\%}$ 651.

EXAMPLE 24
3,9-Bis[4-(4-Phenylpiperidino)Butyryl]Fluoranthene

Following the procedure of Example 18 only substituting for piperidine, 38.6g (0.24 mole) of 4-phenylpiperidine, the solid obtained on workup was recrystallized twice from chloroform-acetone to give the desired product. M.P. 152.5°–155°C, $\lambda_{max}^{CHCl_3}$ 306, $E_{1cm}^{1\%}$ 597.

EXAMPLE 25
3,9-Bis{4-[4-(3-Phenylpropyl)Piperidino]Butyryl-}Fluoranthene

Following the procedure of Example 18 only substituting for piperidine, 48.8g (0.24 mole) of 4-(3-phenylpropyl)piperidine, the solid obtained on workup was recrystallized twice from chloroform-acetone to yield the desired product. M.P. 99°–101°C, $\lambda_{max}^{CHCl_3}$ 305, $E_{1cm}^{1\%}$ 552.

EXAMPLE 26
3,9-Bis(4-Morpholinobutyryl)Fluoranthene Dihydrochloride

Following the procedure of Example 21 but substituting for 4-methylpiperidine, 34.9g (0.4 mole) of morpholine, the dihydrochloride salt obtained on workup was recrystallized twice from methanol-butane. M.P. 188°–191°C, $\lambda_{max}^{H_2O}$ 302, $E_{1cm}^{1\%}$ 584.

EXAMPLE 27
3,9-Bis[4-(1,2,3,6-Tetrahydro-1-Pyridyl)Butyryl]Fluoranthene Dihydrochloride Following the procedure of Example 21 only substituting for 4-methylpiperidine, 33.2g (0.4 mole) of 1,2,3,6-tetrahydropyridine, the dihydrochloride salt obtained on workup was recrystallized twice from methanol. M.P 248°–250°C, $\lambda_{max}^{H_2O}$ 306, $E_{1cm}^{1\%}$ 594.

EXAMPLE 28
3,9-Bis[4-(3-Azabicyclo[3.2.2]Nonan-3-Yl)Butyryl]Fluoranthene

Following the procedure of Example 18 only substituting for piperidine, 30.1g (0.24 mole) of 3-azabicyclo[3.2.2]nonane, the solid obtained on workup was recrystallized twice from chloroform-acetone yielding the desired product. M.P. 146°–148°C, $\lambda_{max}^{CHCl_3}$ 305, $E_{1cm}^{1\%}$ 675.

EXAMPLE 29

By the procedure of Example 18, but substituting for piperidine, the appropriate molar equivalent amounts of N-methylpiperazine, diallylamine or N-methylcyclohexylamine the following compounds are prepared:

3,9-Bis[4-(N-methylpiperazino)butyryl]fluoranthene
3,9-Bis(4-diallylaminobutyryl)fluoranthene
3,9-Bis[4-(N-methylcyclohexylamino)butyryl]fluoranthene.

EXAMPLE 30
3,9-BIS[5-(Dimethylamino)Valeryl]Fluoranthene

A solution of 15.4g (0.035 mole) of 3,9-bis(5-chlorovaleryl)fluoranthene, 50 ml of 40% aqueous dimethylamine, 2.0g of potassium iodide and 210 ml of dioxane was placed in a Paar bomb and heated at 100°C with stirring for 26 hours then stirred at room temperature for 2 days. The excess dimethylamine was removed in vacuo and the reaction mixture was diluted with water. The semi-solid which formed was decanted, dissolved in ether, washed with a water-saturated sodium chloride solution, dried over magnesium sulfate, filtered and the filtrate acidified with ethereal HCl. The resulting dihydrochloride salt was recrystallized three times from methanol-ethyl acetate, then converted to the free base and recrystallized once from ether. M.P. 112°–113°C, $\lambda_{max}^{EtOH}$ 304, $E_{1cm}^{1\%}$ 847.

EXAMPLE 31
3,9-Bis[5-(Diethylamino)Valeryl]Fluoranthene

A solution of 18.0g (0.041 mole) of 3,9-bis(5-chlorovaleryl)fluoranthene, 175 ml of diethylamine, 10g of potassium iodide and 75 ml of tetrahydrofuran was placed in a Paar bomb and heated at 130°C for 25 hours. The reaction mixture was filtered, and the filtrate evaporated to dryness leaving a solid residue which was recrystallized 3 times ether giving the desired product. M.P. 84.5°–85°C, $\lambda_{max}^{EtOH}$ 303, $E_{1cm}^{1\%}$ 764.

EXAMPLE 32

3,9-Bis[5-(Dibutylamino)Valeryl]Fluoranthene Dihydrochloride

A solution of 22.0g (0.05 mole) of 3,9-bis(5-chlorovaleryl)fluoranthene, 40.0g (0.31 mole) of dibutylamine, 2.0g of potassium iodide and 250 ml of p-dioxane was placed in a Paar bomb, heated at 125°–140°C with stirring for 3 days then filtered. The filtrate was poured onto 1000 ml of ice water, and the oil which precipitated was decanted and chromatographed on alumina using ethyl acetate-pentane (1:3) as the eluant. The residue obtained upon removal of the solvent from the fraction collected was dissolved in ether and acidified with ethereal HCl. The solid which precipitated was recrystallized once from methanol-ethyl acetate-ether and once from acetone to give the desired product. M.P. 124°–128°C, $\lambda_{max}^{EtOH}$ 305, $E_{1cm}^{1\%}$ 577.

EXAMPLE 33

3,9-Bis(5-Piperidinovaleryl)Fluoranthene dihydrochloride

A solution of 10.0g (0.023 mole) of 3,9-bis(5-chlorovaleryl)fluoranthene, 1.0g of potassium iodide and 400 ml of piperidine was refluxed with stirring for 6½ hours, then evaporated to dryness and the residual oil extracted into ether. The ether extract was washed with a water-saturated sodium chloride solution, dried over magnesium sulfate, filtered and acidified with ethereal HCl. The solid which precipitated was recrystallized twice from methanol-ethyl acetate to give the desired product. M.P. 241°–243°C, $\lambda_{max}^{H_2O}$ 303, $E_{1cm}^{1\%}$ 559.

EXAMPLE 34

3,9-Bis[5-(4-Methylpiperidio)Valeryl]Fluoranthene

By the procedure of Example 18 with the exception that 23.8 g (0.24 mole) of 4-methylpiperidine and 13.2g (0.03 mole) of 3,9-bis(5-chlorovaleryl)fluoranthene were used, the solid obtained on workup was recrystallized once from butanone to give the desired procuct. M.P. 141°–142°C, $\lambda_{max}^{EtOH}$ 304, $E_{1cm}^{1\%}$ 711.

EXAMPLE 35

3,9-Bis[5-(4-Propylpiperidino)Valeryl]Fluoranthene

By the procedure of Example 18 with the exception that 13.2g (0.03 mole) of 3,9-bis(5-chlorovaleryl)fluoranthene and 30.5g (0.24 mole) of 4-propylpiperidine were used, the solid obtained on workup was recrystallized once from chloroform-acetone giving the desired product. M.P. 146°–148°C, $\lambda_{max}^{EtOH}$ 303, $E_{1cm}^{1\%}$ 650.

EXAMPLE 36

3,9-Bis[5-(4-Benzylpiperidino)Valery]Fluoranthene

Following the procedure of Example 18 with the exception that 13.2g (0.03 mole) of 3,9-bis(5-chlorovaleryl)fluoranthene and 42.0g (0.24 mole) of 4-benzylpiperidine were used, the solid obtained on workup was recrystallized twice from chloroform-acetone yielding the desired product. M.P. 126.5°–128°C, $\lambda_{max}^{CHCl_3}$ 306, $E_{1cm}^{1\%}$ 563.

EXAMPLE 37

3,9-Bis[5-(1,2,3,6-Tetrahydro-1-Pyridyl)Valeryl]Fluoranthene Dihydrochloride Following the procedure of Example 21 with the exception that 22.0g (0.05 mole) of 3,9-bis(5-chlorovaleryl)fluoranthene and 33.2g (0.4 mole) of 1,2,3,6-tetrahydropyridine were used, the dihydrochloride salt obtained on workup was recrystallized twice from methanol-butanone to give the desired product. M.P. 214°–216°C, $\lambda_{max}^{H_2O}$ 304, $E_{1cm}^{1\%}$ 579.

EXAMPLE 38

3,9-Bis[5-(3-Azabicyclo[3.2.2]Nonan-3-Yl)Valeryl]Fluoranthene

Following the procedure of Example 18 with the exception that 13.2g (0.03 mole) of 3,9-bis(5-chlorovaleryl)fluoranthene and 30.1g (0.24 mole) of 3-azabicyclo[3.2.2]nonane were used, the solid obtained on workup was recrystallized twice from chloroform-acetone yielding the desired product. M.P. 142°–143.5°C, $\lambda_{max}^{CHCl_3}$ 306, $E_{1cm}^{1\%}$ 643.

EXAMPLE 39

By the procedure of Example 33, but substituting for 3,9-bis(5-chlorovaleryl)fluoranthene, the appropriate molar equivalent amounts of 3,9-bis(4-chlorovaleryl)fluoranthene, 3,9-bis(4-chloro-2-methylbutyryl)fluoranthene or 3,9-bis(5-chloro-3-methylvaleryl)fluoranthene the following compounds are prepared:

3,9-Bis(4-piperidinovaleryl)fluoranthene
3,9-Bis(4-piperidino-2-methylbutyryl)fluoranthene
3,9-Bis(5-piperidino-3-methylvaleryl)fluoranthene.

EXAMPLE 40

3,9-Bis(3-Piperidinopropionyl)Fluoranthene Dihydrochloride

A solution of 14.3g (0.05 mole) of 3,9-diacetylfluoranthene, 4.5g (0.15 mole) of paraformaldehyde and 12.2g (0.1 mole) of piperidine hydrochloride in 200 ml of butanol was refluxed for 2 hours. The crude product which crystallized on cooling was purified by recrystallization from methanol-ethyl acetate to give the desired product.

What is claimed is:

1. A compound selected from a base of the formula

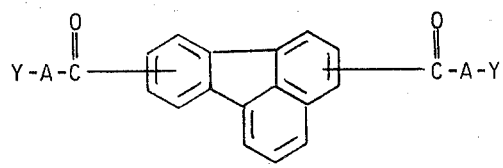

wherein each A is a straight or branched alkylene chain having from 1 to 6 carbon atoms; and each Y is a member selected from the group consisting of A. the group

wherein $R^1$ and $R^2$ are individually hydrogen, (lower)alkyl having from 1 to 6 carbon atoms, cycloalkyl having from 3 to 6 carbon atoms, alkenyl of from 3 to 6 carbon atoms and having the vinyl unsaturation in other than the 1-position of the alkenyl group; or B. the group

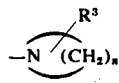

wherein $n$ is a whole integer of from 4 to 6 and $R^3$ is hydrogen, (lower)alkyl of from 1 to 4 carbon atoms, phenyl, or benzyl linked to any one of the carbon atoms of the hetrocyclic group; or C. the group

wherein X is oxygen or $NR^4$, and $R^4$ is hydrogen or (lower)alkyl of from 1 to 4 carbon atoms; or D. the group

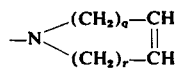

wherein $q$ is a whole integer from 1 to 2, and $r$ is a whole integer from 1 to 3 providing when $r$ is equal to 3, $q$ is 1;
or a pharmaceutically acceptable acid addition salt of said base.

2. A compound of claim 1 where each Y is the group

and one of said

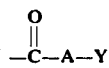

groups is in the 3-position of the fluoranthene ring and the remaining

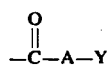

group is in the 8- or 9-position of the fluoranthene ring.

3. A compound of claim 2 wherein each $R^1$ and $R^2$ is (lower)alkyl.

4. A compound of claim 1 wherein ech Y is the group

and one of said

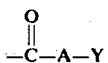

groups is in the 3-position of the fluoranthene ring and the remaining

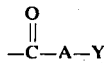

group is in the 8- or 9-position of the fluoranthene ring.

5. A compound of claim 4 wherein $n$ is the integer 5.

6. A compound of claim 1 wherein each Y is the group

and one of said

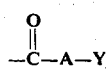

groups is in the 3-position of the fluoranthene ring and the remaining

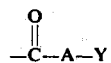

group is in the 8- or 9-position of the fluoranthene ring.

7. A compound of claim 6 wherein X is oxygen.

8. A compound of claim 1 wherein Y is the group

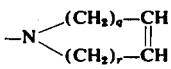

and one of said

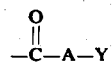

groups is in the 3-position of the fluoranthene ring and the remaining

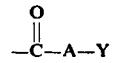

group is in the 8- or 9-position of the fluoranthene ring.

9. A compound of claim 1 which is 3,9-bis(5-dibutylaminovaleryl)fluoranthene or a pharmaceutically acceptable acid addition salt thereof.

10. A compound of claim 1 which is 3,9-bis(4-diethylaminobutyryl)fluoranthene or a pharmaceutically acceptable acid addition salt thereof.

11. A compound of claim 1 which is 3,9-bis(4-methylpiperidinoacetyl)fluoranthene or a pharmaceutically acceptable acid addition salt thereof.

12. A compound of claim 1 which is 3,9-bis[5-(4-methylpiperidino)valeryl]fluoranthene or a pharmaceutically acceptable acid addition salt thereof.

13. A compound of claim 1 which is 3,9-bis(4-morpholinobutyryl)fluoranthene or a pharmaceutically acceptable acid addition salt thereof.

14. A compound of claim 1 which is 3,9-bis(4-piperidinobutyryl)fluoranthene or a pharmaceutically acceptable acid addition salt thereof.

15. A compound of claim 1 which is 3,9-bis[5-(1,2,3,6-tetrahydro-1-pyridyl)valeryl]fluoranthene or a pharmaceutically acceptable acid addition salt thereof.

16. A compound of claim 1 which is 3,9-bis(dimethylaminoacetyl)fluoranthene or a pharmaceutically acceptable acid addition salt thereof.

17. A compound of claim 1 which is 3,9-bis(piperidinoacetyl)fluoranthene or a pharmaceutically acceptable acid addition salt thereof.

18. A compound of claim 1 which is 3,9-bis(diethylaminoacetyl)fluoranthene or a pharmaceutically acceptable acid addition salt thereof.

* * * * *